United States Patent
Miyazaki et al.

(10) Patent No.: US 7,430,856 B2
(45) Date of Patent: Oct. 7, 2008

(54) PRESSURE DETECTION MECHANISM FOR EXHAUST EMISSION CONTROL DEVICE OF INTERNAL COMBUSTION ENGINE

(75) Inventors: Masataka Miyazaki, Aichi-ken (JP); Kazutaka Fujii, Toyota (JP); Hiroaki Ito, Kariya (JP)

(73) Assignees: Toyota Jidosha Kabushiki Kaisha, Toyota-shi, Aichi-ken (JP); Kabushiki Kaisha Toyota Jidoshokki, Kariya-shi, Aichi-ken (JP)

( * ) Notice: Subject to any disclaimer, the term of this patent is extended or adjusted under 35 U.S.C. 154(b) by 0 days.

(21) Appl. No.: 10/938,952

(22) Filed: Sep. 13, 2004

(65) Prior Publication Data

US 2005/0150213 A1 Jul. 14, 2005

(30) Foreign Application Priority Data

Sep. 12, 2003 (JP) .............................. 2003-321413

(51) Int. Cl.
*F01N 3/00* (2006.01)
*F01N 3/10* (2006.01)

(52) U.S. Cl. .............................. 60/287; 60/282; 60/295; 60/301

(58) Field of Classification Search .................. 60/287, 60/282, 295, 301
See application file for complete search history.

(56) References Cited

U.S. PATENT DOCUMENTS

| | | | |
|---|---|---|---|
| 5,207,990 A | 5/1993 | Sekiya et al. | |
| 6,079,203 A * | 6/2000 | Wakamoto | 60/274 |
| 6,405,528 B1 | 6/2002 | Christen et al. | |
| 6,415,602 B1 * | 7/2002 | Patchett et al. | 60/295 |
| 6,615,577 B2 * | 9/2003 | Meyer et al. | 60/276 |
| 6,708,487 B2 * | 3/2004 | Morimoto et al. | 60/311 |
| 6,843,054 B2 * | 1/2005 | Taylor et al. | 60/275 |
| 7,021,048 B2 * | 4/2006 | Taylor et al. | 60/295 |
| 2002/0112472 A1 * | 8/2002 | Tashiro et al. | 60/295 |
| 2003/0154713 A1 * | 8/2003 | Hiratsuka et al. | 60/297 |

FOREIGN PATENT DOCUMENTS

| | | |
|---|---|---|
| EP | 1 291 513 A2 | 3/2003 |
| FR | 2 832 758 A1 | 5/2003 |
| JP | 2-271022 | 11/1990 |
| JP | 4-128509 | 4/1992 |

* cited by examiner

*Primary Examiner*—Thomas Denion
*Assistant Examiner*—Loren Edwards
(74) *Attorney, Agent, or Firm*—Finnegan, Henderson, Farabow, Garrett & Dunner, LLP

(57) ABSTRACT

A pressure detection mechanism for a catalyst of an engine, in which the catalyst includes an upstream NSR catalyst and a downstream DPNR catalyst stored in a catalyst casing, which includes a DPNR front pressure detection pipe connected to a space formed by the NSR catalyst, the DPNR catalyst and the catalyst casing, a DPNR rear pressure detection pipe downstream of the DPNR catalyst connected to a space formed by the DPNR catalyst and the catalyst casing, and a pressure difference transducer connected to the DPNR front pressure detection pipe and the DPNR rear pressure detection pipe.

6 Claims, 2 Drawing Sheets

PRESSURE DETECTION MECHANISM FOR EXHAUST EMISSION CONTROL DEVICE OF INTERNAL COMBUSTION ENGINE

INCORPORATION BY REFERENCE

The disclosure of Japanese Patent Application No. 2003-321413 filed on Sep. 12, 2003 including the specification, drawings and abstract is incorporated herein by reference in its entirety.

BACKGROUND OF THE INVENTION

1. Field of the Invention

The invention relates to an emission control device provided in an exhaust system of an internal combustion engine. More specifically, the invention relates to a pressure detection mechanism for an exhaust emission control device that is provided in the exhaust system for purifying a toxic component in exhaust.

2. Description of the Related Art

In a diesel engine or a lean burn gasoline engine, an operation range that performs engine operation that supplies an air-fuel mixture with a high air-fuel ratio (a lean atmosphere) for combustion makes up a major portion of the entire operation range. An exhaust system of this type of engine (an internal combustion engine) is generally provided with an absorbent (a catalyst) for absorbing nitrogen oxides (NOx) in the presence of oxygen.

Furthermore, a great deal of technology has been developed relating to the removal of particulates (also referred to as PM, or particulate matter) such as carbon that are emitted from diesel engines. One example is an exhaust particulate processing device provided with a filter-shaped exhaust trap equipped with a catalyst, which is interposed in an exhaust passage. This catalyst-equipped trap has a catalytic action that causes deposited exhaust particulates to self-combust. The Japanese Patent Laid Open Publications listed below disclose technology related to these catalyst-equipped traps.

Since self-combustion is not sufficient to allow regeneration of the trap, an exhaust particulate processing device for an internal combustion engine such as described in Japanese Patent Laid-Open Publication No. Hei 2-271022 uses a heater to perform automatic regeneration of the trap. This exhaust particulate processing device for an internal combustion engine is provided with a catalyst-equipped trap interposed in an exhaust passage of the internal combustion engine, an exhaust bypass passage shaped so as to bypass the catalyst-equipped trap, a bypass valve that opens and closes the exhaust bypass passage, a heater provided upstream of the catalyst-equipped trap, a mechanism for detecting a particulate deposition state of the catalyst-equipped trap using a pressure loss therein, a control mechanism for promoting combustion of deposited exhaust particulate by application of heat from the heater when a predetermined operating condition is reached, and a warning mechanism that operates when an excess deposition state is detected.

The warning mechanism of the exhaust particulate processing device for an internal combustion engine operates on detection of an excess deposition state and notifies a vehicle operator of an abnormality, so as to prompt a manual operation to regenerate the catalyst-equipped trap. Therefore, if for some reason an excess amount of exhaust particulate becomes deposited, the warning mechanism prevents melting loss of the catalyst-equipped trap or sudden stop of the internal combustion engine due to the vehicle operator continuing to operate the vehicle unaware that excess deposition has occurred.

Japanese Patent Laid-Open Publication No. Hei 4-128509 discloses an exhaust system that uses a reliable method to substantially reduce particulate discharge from an internal combustion engine. This exhaust system is provided with a main flow path and a bypass flow path for directing exhaust gas from an entrance portion of the system to an exit portion, a valve for directing the exhaust gas through one of the flow paths in a selective fashion, a filter for filtering the exhaust gas that has been directed through the main flow path, a regeneration portion member provided between the valve and the filter, an oxidization portion member provided downstream of the main flow path filter, and a control portion member, which causes the regeneration portion member to operate immediately after a predetermined state is detected, and which controls the flow of the exhaust gas so as to stop the regeneration portion member when a regeneration process is complete.

This exhaust system is provided with a sensor adjoining the filter in the main flow path for detecting a predetermined state. When a state is detected where the filter is sufficiently filled with particulate, the valve is switched so that the exhaust gas immediately passes through the bypass flow path, and a high-temperature diesel fuel burner is ignited to carry out the regeneration process. When the high-temperature diesel fuel burner is ignited, heated gas containing 11 to 15% oxygen is passed through the trap from the burner. The particulate collected in the trap is combusted and then passed through an oxidization catalyst to carry out further burning of incombustible carbohydrates, thereby enabling discharge into the atmosphere.

However, the exhaust particulate processing device for an internal combustion engine disclosed in Japanese Patent Laid-Open Publication No. Hei 2-271022 is provided with a first pressure sensor upstream of the trap and a second pressure sensor downstream of the trap. A particulate deposition state is detected from a pressure loss of the trap based on a pressure difference of these two sensors. The exhaust system disclosed in Japanese Patent Laid-Open Publication No. Hei 4-128509 is provided with a pressure difference sensor in the main flow path for detecting a pressure difference applied to the trap. An index that shows the degree of particulate mass filling the trap is calculated based on this pressure difference.

Each of the devices in the aforementioned Japanese Patent Laid-Open Publications is provided with a pressure sensor pipe upstream of the catalyst-equipped trap. Fuel is added upstream of the catalyst traps through a fuel addition nozzle, temporarily reducing the oxygen concentration in the exhaust and temporarily increasing the quantity of a reducing component (HC or the like) in the catalyst-equipped traps. When this kind of process is performed, a fuel component is mixed with the exhaust, making the pressure sensor pipe provided upstream of the catalyst-equipped trap susceptible to blockage by an exhaust deposit. Blockage of the pressure sensor pipe by an exhaust deposit makes detection of a correct pressure difference and, therefore, detection of an accurate PM deposit amount difficult.

SUMMARY OF THE INVENTION

It is an object of the invention to provide a pressure detection mechanism for detecting an accurate pressure or a pressure difference in an exhaust emission control device for an internal combustion engine.

The pressure detection mechanism according to a first aspect of the invention is provided in the exhaust emission control device for an internal combustion engine, in which the exhaust emission control device includes an N amount of catalytic elements (N being an integer of 2 or more) and the catalytic elements are arranged in series from a first catalytic element to the Nth catalytic element oriented from upstream close to the internal combustion engine to downstream. The pressure detection mechanism includes an upstream pressure detection portion provided in a space between the first catalytic element and an Mth catalytic element (M being an integer of 2 or more equal to or less than N), and a downstream pressure detection portion provided to the downstream of the Mth catalytic element. The upstream pressure detection portion and the downstream pressure detection portion of the pressure detection mechanism detect blockage of the Mth catalytic element based on a pressure detected by the upstream pressure detection portion and a pressure detected by the downstream pressure detection portion.

According to the first aspect, at least two catalytic elements, for example, a NOx storage reduction (NSR) catalyst for absorbing NOx and a diesel particulate NOx reduction (DPNR) catalyst for removing particulate matter (PM) such as carbon and the like and for absorbing NOx, may be arranged in series for purifying exhaust gas of a diesel engine.

In this case, fuel is added further upstream than the furthest upstream catalytic element through a fuel addition nozzle of the internal combustion engine, causing an oxygen concentration in exhaust to temporarily decrease and an amount of a reducing component (HC or the like) to temporarily increase (this is also referred to as exhaust addition). If the oxygen concentration in the exhaust temporarily decreases and the amount of the reducing component (HC or the like) temporarily increases, the catalytic elements reduce and discharge NOx absorbed until this point as $NO_2$ or NO in order to recover (i.e. regenerate) the NOx absorption capacity thereof. If exhaust addition is carried out in this way, a fuel component becomes mixed with the exhaust gas upstream of the NSR catalyst, which is the furthest upstream catalytic element.

Therefore, if a pressure detection pipe is provided upstream of the NSR catalyst, which is the furthest upstream catalytic element, this pipe may become blocked by the fuel component and it may become impossible to detect accurately a pressure difference between the front and rear of the DPNR catalyst, thereby making it impossible to detect accurately a condition of PM collection and storage in the DPNR catalyst.

The pressure detection mechanism according to the first aspect is provided with the upstream pressure detection portion in a space between the NSR catalyst, which is a first catalytic element, and the DPNR catalyst in order to detect blockage of the DPNR catalyst, which is a second catalytic element. Therefore, since the pressure detection portion is only provided downstream of the NSR catalyst, the pressure detection pipe no longer becomes blocked even when exhaust addition occurs, the pressure difference between the front and rear of the DPNR catalyst may be accurately detected, thereby enabling accurate detection of the condition of PM collection and storage in the DPNR catalyst.

Furthermore, even if PM is temporarily collected and stored in the NSR catalyst, the pressure difference between the front and rear of the DPNR catalyst may be detected accurately, and the increase in PM may be detected by an increase in pressure loss. A heater is not required once the temperature of the exhaust gas is increased by operation of the vehicle, since the temperature of the NSR catalyst increases, thereby combusting the PM. As a result, the pressure detection mechanism for detecting an accurate pressure or a pressure difference in the exhaust emission control device of an internal combustion engine is provided.

In the pressure detection mechanism according to the first aspect of the invention, the upstream pressure detection portion may be provided in a space between an M-1th catalytic element and the Mth catalytic element. With this configuration, when the NSR catalyst and the DPNR catalyst are arranged in series, an upstream pressure detection pipe is provided between the NSR catalyst and the DPNR catalyst as the upstream pressure detection portion, and the DPNR catalyst is provided with a downstream pressure detection pipe as the downstream pressure detection portion. This configuration is able to, for example, detect the pressure difference between a pressure in the upstream pressure detection pipe and a pressure in the downstream pressure detection pipe, and is able to detect the condition of PM collection and storage in the DPNR catalyst from a change in that pressure difference.

In the pressure detection mechanism according to the first aspect of the invention, the blockage of the Mth catalytic element (M being an integer of 2 or more equal to or less than N) may be detected based on a pressure difference between the pressure detected by the upstream pressure detection portion and the pressure detected by the downstream pressure detection portion. With this configuration, when the NSR catalyst and the DPNR catalyst are arranged in series, the upstream pressure detection pipe is provided between the NSR catalyst and the DPNR catalyst as the upstream pressure detection portion, and the DPNR catalyst is provided with the downstream pressure detection pipe as the downstream pressure detection portion. If, for example, a pressure difference detector (i.e. a pressure difference transducer) is then connected to the upstream pressure detection pipe and the downstream pressure detection pipe, this configuration is able to detect the condition of PM collection and storage in the DPNR catalyst from a change in the pressure difference detected thereby. Therefore, two sensors (i.e. an upstream pressure sensor and a downstream pressure sensor) are no longer required, and it is sufficient to provide only a single pressure difference transducer.

In the pressure detection mechanism according to the first aspect of the invention, the integers N and M may equal 2, and the exhaust emission control device may be configured so as to include two catalytic elements arranged in series, of which the first catalytic element may be a catalyst that treats nitrogen oxides and the second catalytic element may be a catalyst that treats PM and nitrogen oxides emitted from a diesel engine. The NSR catalyst may be provided as the first catalytic element and the DPNR catalyst may be provided as the second catalytic element. If this is the case and these catalytic elements are arranged in series, then the upstream pressure detection portion is provided between the NSR catalyst and the DPNR catalyst, and the downstream pressure detection portion is provided further downstream of the DPNR catalyst. This configuration is able to, for example, detect a pressure difference between the upstream pressure detection portion and the downstream pressure detection portion, and is able to detect the condition of PM collection and storage in the DPNR catalyst from a change in that pressure difference.

In the first aspect of the invention, the pressure detection mechanism may further include a pressure difference detection portion that detects the pressure difference between the pressure detected by the upstream pressure detection portion and the pressure detected by the downstream pressure detection portion. The first catalytic element and the second catalytic element may also be configured so as to be stored in a catalyst casing. The upstream pressure detection portion may be configured so as to include a first pipe connected to a space formed by the first catalytic element, the second catalytic element and the catalyst casing. The downstream pressure detection portion may be configured so as to include a second pipe downstream of the second catalytic element connected to a space formed by the second catalytic element and the catalyst casing. The first pipe and the second pipe may be connected with the pressure difference detection portion. The NSR catalyst may be provided as the first catalytic element and the DPNR catalyst may be provided as the second catalytic element. If this is the case and these catalytic elements are arranged in series and stored in the catalyst casing, then the first pipe is provided in the space formed by the NSR catalyst, the DPNR catalyst and the catalyst casing, and the second pipe is provided downstream of the DPNR catalyst in the space formed by the DPNR catalyst and the catalyst casing. With this configuration, a fuel component does not block the first pipe even when exhaust addition occurs because the first pipe is provided downstream of the NSR catalyst. Therefore, a pressure difference between the pipes can be detected, enabling detection of the condition of PM collection and storage in the DPNR catalyst from a change in that pressure difference. Furthermore, since the first pipe is provided in the space formed by the NSR catalyst, the DPNR catalyst and the catalyst casing, provision of a particular additional new element or member is not required.

In the pressure detection mechanism according to the first aspect of the invention, the pressure difference detection portion may be configured so as to detect blockage of the second catalytic element based on a pressure difference between a pressure in the first pipe and a pressure in the second pipe. In this case, it is possible to determine whether a large amount of PM has been collected and stored from a change in that pressure difference, generated by an increase in pressure loss caused by blockage due to PM being collected and stored in the DPNR catalyst.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
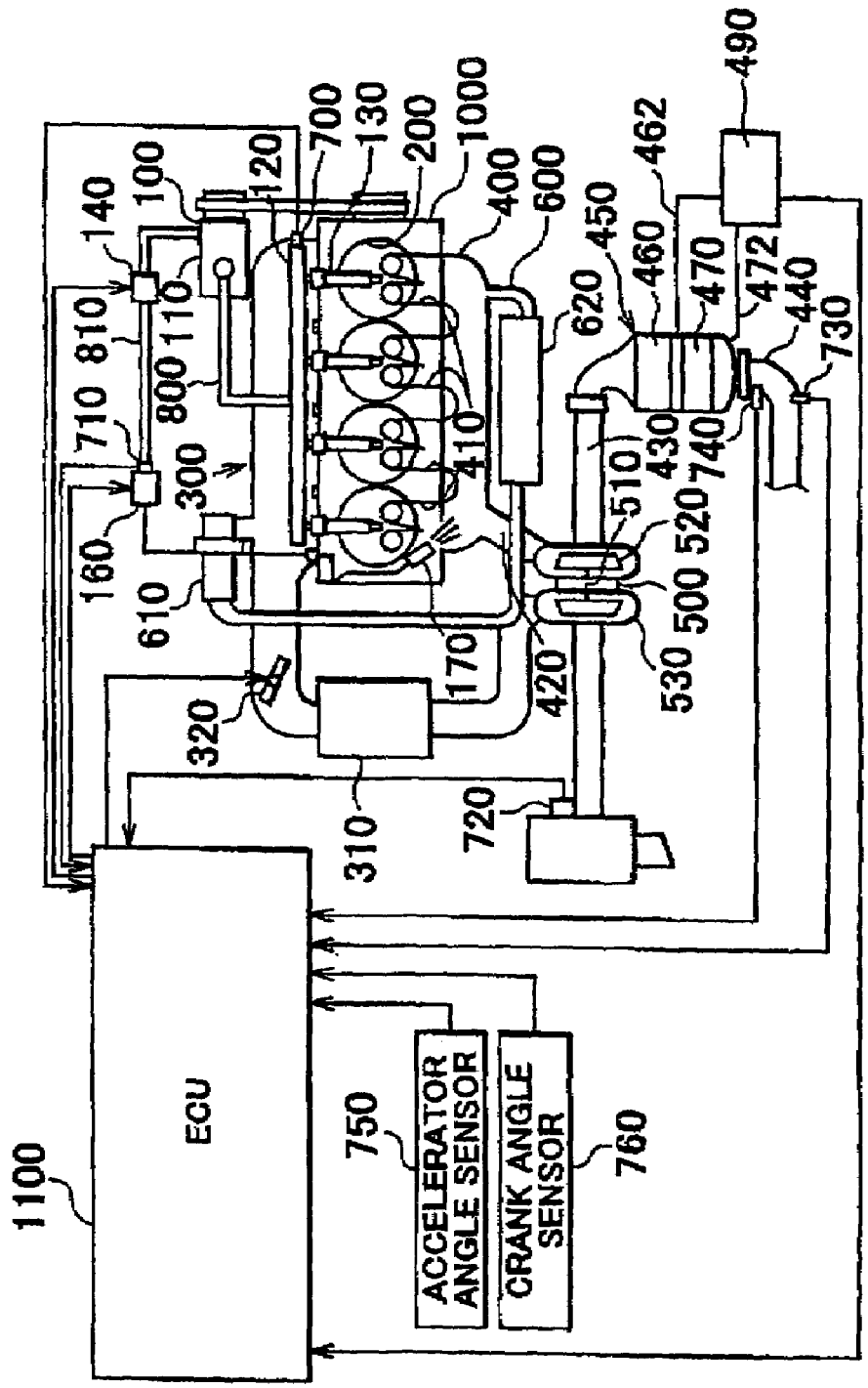
FIG. 1 is a schematic view of a diesel engine system according to an embodiment of the invention.

Hereafter, embodiments of the invention will be described with reference to the accompanying drawings. In the description of the embodiments below, the same reference numerals are attached to identical parts. These parts have identical names and functions and, therefore, detailed description thereof is not repeated.

A pressure detection mechanism for an exhaust emission control device of an internal combustion engine according to an embodiment of the invention is described below as an embodiment applied to a diesel engine system. First, a description will be given of the diesel engine system to which the pressure detection mechanism is applied. Note that the diesel engine system combines a high-pressure common rail fuel injection device, a high-capacity electronically controlled exhaust gas recirculation (EGR) cooler and a DPNR catalyst to carry out continuous and simultaneous reduction of PM and NOx, for the purpose of achieving clean exhaust of the diesel engine.

An internal combustion engine (hereinafter referred to as the engine) 1000 as shown in FIG. 1 is an in-line 4-cylinder diesel engine system that includes major components such as a fuel supply system 100, a combustion chamber 200, an air intake system 300 and an exhaust system 400.

The fuel supply system 100 includes a supply pump 110, a common rail 120, a fuel injection valve 130, a shut-off valve 140, a metering valve 160, a fuel addition nozzle 170, an engine fuel passage 800, an added fuel passage 810 and the like.

The supply pump 110 draws fuel from the fuel tank and supplies that fuel under high-pressure to the common rail 120 through the engine fuel passage 800. The common rail 120 functions as an accumulator that maintains (i.e. accumulates) the high-pressure fuel supplied from the supply pump 110 at a predetermined pressure, and then distributes the accumulated fuel to each fuel injection value 130. The fuel injection valve 130 contains an electromagnetic solenoid, and opens and closes in an appropriate manner to carry out injection supply of fuel into the combustion chamber 200.

The supply pump 110 supplies a portion of the fuel drawn from the fuel tank to the fuel addition nozzle (also known as the reductant injection nozzle) 170 through the added fuel passage 810. The shut-off valve 140 and the metering valve 16 are provided in sequence in the added fuel passage 810, oriented toward the fuel addition nozzle 170 from the supply pump 110. The shut-off valve 140 cuts off the added fuel passage 810 in an emergency to stop the supply of fuel. The metering valve 160 controls the pressure of the fuel supplied to the fuel addition nozzle 170. The fuel addition nozzle 170 is a mechanical check valve that opens when imparted with a predetermined fuel pressure or more (for example, 0.2 Mpa), and carries out injection supply of fuel into the exhaust system 400 (more specifically, into an exhaust port 410). In other words, injection supply (i.e. addition) of a desired quantity of fuel takes place at an appropriate timing from the fuel addition nozzle 170 by controlling the fuel pressure upstream of the fuel addition nozzle 170 using the metering valve 160.

The air intake system 300 includes a passage for intake air (also known as an intake passage) to be supplied to each combustion chamber 200. The exhaust system 400 is configured from upstream to downstream by the following passage members connected in sequence: the exhaust port 410, an exhaust manifold 420, a catalyst upstream passage 430 and a catalyst downstream passage 440. The exhaust system 400 forms a passage for exhaust gas (also known as an exhaust passage) emitted from each combustion chamber 200.

A widely known supercharger (hereinafter referred to as the turbocharger) 500 is also provided in the engine 1000. The turbocharger 500 includes a turbine wheel 520 and a turbine wheel 530 that are connected to each other through a shaft 510. The turbine wheel (hereinafter referred to as the intake side turbine wheel) 530 is exposed to air intake inside the air intake system 300, whereas the other turbine wheel (hereinafter referred to as the exhaust side turbine wheel) 520 is exposed to exhaust inside the exhaust system 400. The turbocharger 500 with this configuration increases the air intake pressure (the so-called supercharging effect) by using exhaust flow (i.e. exhaust pressure) received by the exhaust side turbine wheel 520 to rotate the intake side turbine wheel 530.

In the air intake system 300, the turbocharger 500 is provided with an intercooler 310, which carries out forcible cooling of intake air that has been heated by the supercharging effect. A throttle valve 320, which is provided further downstream of the intercooler 310, is an electronically controlled check valve with a continuously adjustable degree of opening. The throttle valve 320 narrows the area of the intake airflow path under predetermined conditions, thereby functioning to adjust (i.e. to reduce) a supply amount of the intake air.

An exhaust gas recirculation passage (hereinafter referred to as the EGR passage) 600, which bypasses upstream (i.e. the air intake system 300) and downstream (i.e. the exhaust system 400) of the combustion chamber 200, is also provided in the engine 1000. The EGR passage 600 functions to return appropriately a portion of the exhaust to the air intake system 300. The EGR passage 600 includes an EGR valve 610, which is opened and closed continuously by electronic control and is able to freely adjust the exhaust flow rate passing through the EGR passage 600, and an EGR cooler 620 for cooling the exhaust that passes through (i.e. recirculates) the EGR passage 600.

A catalyst, which includes an NSR catalyst 460 and a DPNR catalyst 470, is provided in the exhaust system 400 downstream of the exhaust side turbine wheel 520 (i.e. between the catalyst upstream passage 430 and the catalyst downstream passage 440).

The NSR catalyst 460 is a storage-reduction NOx catalyst. It may include a carrier composed of, for example, alumina ($Al_2O_3$) and, for example, an alkali metal such as potassium (K), sodium (Na), lithium (Li) or cesium (Cs), an alkaline earth element such as barium (Ba) or calcium (Ca), a rare earth element such as lanthanum (La) or yttrium (Y), or a precious metal such as platinum (Pt) supported on the carrier.

When a large quantity of oxygen is present in the exhaust, the NSR catalyst 460 absorbs NOx. When the oxygen concentration in the exhaust is low and there is a large quantity of a reducing component (for example, an incombustible component in the fuel such as HC), the NSR catalyst 460 reduces and discharges NOx as $NO_2$ or NO. NOx discharged as $NO_2$ or NO is further reduced to $N_2$ by rapid reactions with HC or CO present in the exhaust. HC and CO are oxidized by this reduction of $NO_2$ or NO, forming $H_2O$ or $CO_2$. In other words, it is possible to purify HC, CO and NOx present in exhaust if the oxygen concentration and the HC component in the exhaust that is directed into the NSR catalyst 460 are adequately adjusted.

The DPNR catalyst 470 includes a NOx storage-reduction catalyst combined with a porous ceramic structure. Exhaust gas from the engine 1000 is oxidized and reduced by the catalyst while passing through gaps in the ceramic structure, being chemically transformed into a non-toxic gas and then exhausted.

PM is temporarily collected and stored by the porous-structure catalyst during lean combustion (lean combustion with a large amount of oxygen) and, at the same time, oxidized and purified by active oxygen generated when NOx is stored and by oxygen in the exhaust gas. NOx is briefly stored by the catalyst during lean combustion, and is then reduced and purified by a momentary rich combustion (rich air-fuel ratio combustion with a low amount of oxygen). Furthermore, the PM is oxidized and purified by active oxygen generated on reduction of the stored NOx during the rich combustion.

Each portion of the engine 1000 is provided with sensors that output signals relating to environmental conditions of each portion and operation states of the engine 1000.

The following are presented as examples of these sensors. A rail pressure sensor 700 outputs a detection signal in accordance with a pressure of fuel stored in the common rail 120. A fuel pressure sensor 710 outputs a detection signal in accordance with a pressure Pg of fuel (i.e. a fuel pressure) directed to the metering valve 160. An airflow meter 720 outputs a detection signal in accordance with a flow rate Ga of intake air (i.e. an intake air volume) downstream of the throttle valve 320 in the air intake system 300. An air-fuel ratio (A/F) sensor 730 outputs a detection signal that changes continuously in accordance with an oxygen concentration in the exhaust downstream of a catalyst casing of the exhaust system 400. An exhaust temperature sensor 740 outputs a detection signal in accordance with a temperature Tex of the exhaust (i.e. an exhaust temperature) downstream of the same catalyst casing of the exhaust system 400.

Further examples include an accelerator angle sensor 750, which is provided on an accelerator pedal of the engine 1000 and outputs a detection signal in accordance with a depression amount Acc of that pedal, and a crank angle sensor 760, which outputs a detection signal (a pulse) each time an output shaft (i.e. a crankshaft) of the engine 1000 rotates by a predetermined angle. Each of the sensors 700 to 760 is electrically connected to an electronic control unit (hereinafter referred to as the ECU) 1100.

The ECU 1100 includes a central processing unit (CPU), read only memory (ROM), random access memory (RAM), backup RAM, a timer, a counter and the like. These are connected with an external input circuit, including an analog/digital (A/D) transformer, and an external output circuit, through a two-way bus.

Detection signals of the aforementioned sensors are input into the ECU 1100 via the external input circuit. Based on these signals, the ECU 1100 carries out basic control with regards to fuel injection and the like of the engine 1000, and carries out various types of control related to an operation state of the engine 1000, such as addition control and the like of the reductant (i.e. the fuel) with regards to determination of addition timing and supply volumes and the like when the addition of reductant (i.e. the fuel that functions as the reductant) takes place.

Hereafter the basic principle of fuel addition performed by the ECU 1100 is briefly described.

In diesel engines in general, the oxygen concentration of the mixture of fuel and air supplied for combustion in the combustion chamber is high in most operation ranges. Normally the oxygen concentration of the mixture supplied for combustion is reflected directly in the oxygen concentration in the exhaust, after subtracting the amount of oxygen used for combustion. As a fundamental principle, the higher the oxygen concentration in the mixture, the higher the oxygen concentration in the exhaust (i.e. the higher the air-fuel ratio in the mixture, the higher the air-fuel ratio in the exhaust). On the other hand, as described above, the storage-reduction NOx catalyst will absorb NOx as long as there is a high concentration of oxygen in the exhaust, since it absorbs NOx if the oxygen concentration in the exhaust is high and reduces and discharges NOx as $NO_2$ or NO if the oxygen concentration is low. The NOx absorption amount of this catalyst, however, has a limit. When the NOx absorption limit is reached, NOx in the exhaust will not be absorbed, but will pass through the catalyst casing.

Therefore, in an internal combustion engine provided with the fuel addition nozzle 170 like the engine 1000, the oxygen concentration in the exhaust is temporarily reduced and the amount of the reducing component (HC or the like) is temporarily increased by adding fuel upstream of a catalyst 450 of the exhaust system 400 through the fuel addition nozzle 170 at an appropriate timing (this is hereinafter referred to as exhaust addition). By doing so, the catalyst 450 reduces and discharges the NOx absorbed until this point as $NO_2$ or NO, thereby recovering (i.e. regenerating) the NOx absorption capacity therein. As described above, the discharged $NO_2$ and NO then react with HC and CO and are reduced rapidly to $N_2$.

At this point, the efficiency of reduction and purification for the catalyst 450, which carries out reduction and purification while discharging the NOx stored therein as described above, is determined by the amount of the reducing component (i.e. the concentration of fuel) in the exhaust that flows into the catalyst casing and the oxygen concentration (i.e. the air-fuel ratio).

Therefore, fuel addition (i.e. fuel addition control) to the exhaust system 400 in the engine 1000 is performed so as to acquire in a stable fashion an appropriate amount of the reducing component and an appropriate air-fuel ratio in the exhaust.

Figure 2:
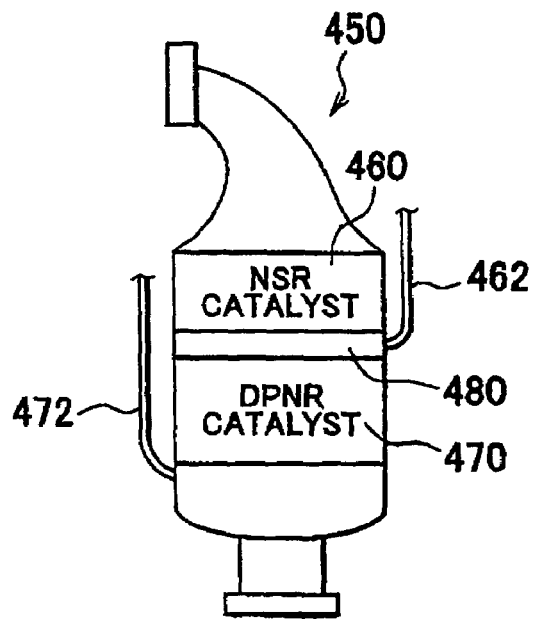
FIG. 2 is a structural diagram of the catalyst from FIG. 1 and a pressure detection mechanism of that catalyst.

Moreover, the state of PM collected and stored in the DPNR catalyst 470 is detected by detecting a pressure difference between the front and the rear of the catalyst 450. In more detail, as shown in FIG. 2, a DPNR front pressure detection pipe 462 is provided in a gap 480 upstream (i.e. toward the engine 1000) of the porous ceramic structure DPNR catalyst 470 for removing PM from exhaust gas, and a DPNR rear pressure detection pipe 472 is provided downstream of the DPNR catalyst 470. The DPNR front pressure detection pipe 462 and the DPNR rear pressure detection pipe 472 are connected to a pressure difference transducer 490 (see FIG. 1) for detecting a pressure difference therein. The pressure difference transducer 490 transforms the detected pressure difference into an electrical signal and transmits the signal to the ECU 1100.

Figure 3:
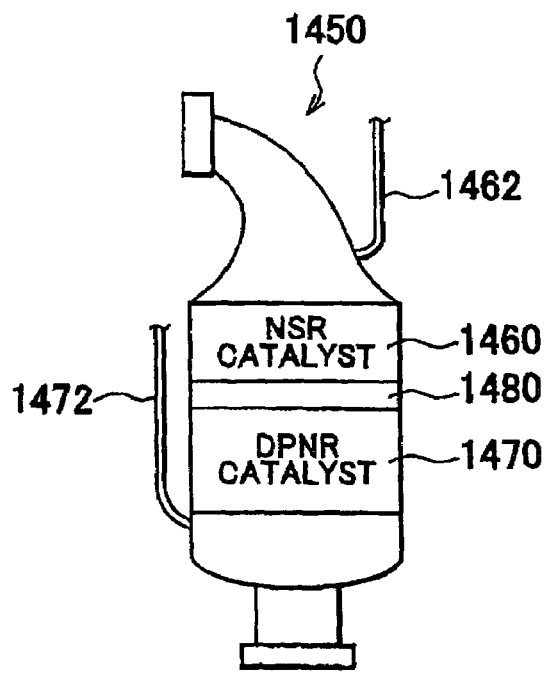
FIG. 3 is a structural diagram of a conventional catalyst and a pressure detection mechanism of that catalyst.

Conventionally, as shown in FIG. 3, an NSR front pressure detection pipe 1462 is provided upstream (i.e. toward the engine 1000) of an NSR catalyst 1460, and a DPNR rear pressure detection pipe 1472 is provided downstream of a DPNR catalyst 1470. The NSR front pressure detection pipe 1462 and the DPNR rear pressure detection pipe 1472 are connected to the pressure difference transducer (not shown) for detecting a pressure difference therein. The conventional detection method, therefore, has a defect where, if exhaust addition is carried out upstream of the catalyst 1450, a fuel component is mixed with the exhaust gas, making the NSR front pressure detection pipe 1462 susceptible to blockage.

The pressure detection mechanism according to this embodiment, however, has a structure as shown in FIG. 2. In other words, since the DPNR front pressure detection pipe 462 is modified so as to be provided downstream of the NSR catalyst 460, the fuel component no longer blocks the DPNR front pressure detection pipe 462 and the pressure difference transducer 490, which is connected to the DPNR front pressure detection pipe 462 and the DPNR rear pressure detection pipe 472, is able to accurately detect the pressure difference between the front and rear of the DPNR catalyst.

Therefore, with regards to a catalyst provided with an NSR catalyst upstream and a DPNR catalyst downstream, the pressure detection mechanism according to this embodiment is able to accurately detect a blocked state of the porous ceramic structure for removing PM based on a change in pressure difference between the front and rear of the catalyst. In other words, cases of pipe blockage caused by PM or the fuel component resulting from exhaust addition have occurred since an upstream pressure detection pipe is conventionally connected upstream of the NSR catalyst. However, since the upstream pressure detection pipe is now connected downstream of the NSR catalyst and upstream of the DPNR catalyst (i.e. between the NSR catalyst and the DPNR catalyst), the upstream pressure pipe that is connected to the pressure difference transducer is no longer blocked. As a result, the blocked state of the porous ceramic structure can be detected accurately based on the fact that PM or the like has been collected and stored in the DPNR catalyst, causing the pressure difference to become large.

Note that although the embodiment described above has been explained using two catalyst members, an NSR catalyst and a DPNR catalyst, the invention is not limited to this, and three or more catalyst members may be applied. Furthermore, although the embodiment described above has been explained using a diesel engine, the invention is not limited to this and another internal combustion engine other than a diesel engine may be applied.

The embodiments of the invention disclosed herein are to be considered in all respects as illustrative and not restrictive. In addition, the scope of the invention is indicated by the scope of the claims rather than by the foregoing description, and all changes that fall within the meaning and scope of equivalency of the claims are therefore intended to be embraced therein.

What is claimed is:

1. A pressure detection mechanism, provided in an exhaust emission control device for an internal combustion engine, wherein the exhaust emission control device includes an N amount of catalytic elements, N being an integer of 2 or more, and the catalytic elements are arranged in series from a first catalytic element to the Nth catalytic element oriented from upstream close to the internal combustion engine to downstream comprising:

an upstream pressure detection portion provided in a space between the first catalytic element and an Mth catalytic element, M being an integer of 2 or more equal to or less than N;

a downstream pressure detection portion provided downstream of the Mth catalytic element, wherein blockage of the Mth catalytic element is detected based on a pressure detected by the upstream pressure portion and a pressure detected by the downstream pressure detection portion; and a controller;

wherein at least one catalytic element provided upstream of the upstream pressure detection portion is a NOx storage reduction catalytic element;

wherein the upstream pressure detection portion is provided in a space between an M-1th catalytic element and the Mth catalytic element; and wherein said at least one catalytic element provided upstream of the upstream pressure detection portion is in constant communication with exhaust gas from the internal combustion engine.

2. The pressure detection mechanism according to claim 1, wherein the blockage of the Mth catalytic element is detected based on a pressure difference between the pressure detection portion and the pressure detected by the downstream pressure detection portion.

3. The pressure detection mechanism according to claim 1, wherein the controller adds fuel upstream of the NOx storage reduction catalytic element when the NOx absorption level in the NOx storage reduction catalytic element reaches a predetermined value lower than a limit of NOx absorption capacity.

4. A pressure detection mechanism, provided in an exhaust emission control device for an internal combustion engine wherein the exhaust emission control device includes an N amount of catalytic elements N being an integer of 2 or more, and the catalytic elements are arranged in
series from a first catalytic element to the Nth catalytic element oriented from upstream close to the internal combustion engine to downstream comprising:

an upstream pressure detection portion provided in a space between the first catalytic element and an Mth catalytic element M being an integer of 2 or more equal to or less than N;

a downstream pressure detection portion provided downstream of the Mth catalytic element, wherein blockage of the Mth catalytic element is detected based on a pressure detected by the upstream pressure portion and a pressure detected by the downstream pressure detection portion; and a controller;

wherein at least one catalytic element provided upstream of the upstream pressure detection portion is a NOx storage reduction catalytic element;

wherein the upstream pressure detection portion is provided in a space between an M-1th catalytic element and the Mth catalytic element;

wherein N and M equal 2;

the exhaust emission control device includes two catalytic elements arranged in series;

the first catalytic element is a catalyst that treats nitrogen oxide; and a second catalytic element is a catalyst that treats particulate and nitrogen oxide emitted from a diesel engine.

5. The pressure detection mechanism according to claim 4, further comprising a pressure difference detection portion that detects the pressure difference between the pressure detected by the upstream pressure detection portion and the pressure detected by the downstream pressure detection portion, wherein;

the first catalytic element and the second catalytic element are stored in a catalyst casing;

the upstream pressure detection portion includes a first pipe connected to a space formed by the first catalytic element, the second catalytic element and the catalyst casing;

the downstream pressure detection portion includes a second pipe downstream of the second catalyst element connected to a space formed by the second catalytic. element and the catalyst casing; and the first pipe and the second pipe are connected with the pressure difference detection portion.

6. The pressure detection mechanism according to claim 5, wherein the pressure difference portion detects blockage of the second catalytic element based on a pressure difference between a pressure in the first pipe and a pressure in the second pipe.

* * * * *

UNITED STATES PATENT AND TRADEMARK OFFICE
CERTIFICATE OF CORRECTION

PATENT NO. : 7,430,856 B2  
APPLICATION NO. : 10/938952  
DATED : October 7, 2008  
INVENTOR(S) : Masataka Miyazaki et al.

Page 1 of 1

It is certified that error appears in the above-identified patent and that said Letters Patent is hereby corrected as shown below:

Claim 5, col. 12, line 15, delete the period "." after "catalytic"

Signed and Sealed this

Twenty-fourth Day of February, 2009

JOHN DOLL  
*Acting Director of the United States Patent and Trademark Office*